(12) United States Patent
Crum et al.

(10) Patent No.: US 7,414,413 B2
(45) Date of Patent: Aug. 19, 2008

(54) BLADE TIP CLEARANCE PROBE HOLDER AND A METHOD FOR MEASURING BLADE TIP CLEARANCE

(75) Inventors: Gregory Allan Crum, Mauldin, SC (US); Joseph Kirzhner, Simpsonville, SC (US); Kenneth D. Black, Greenville, SC (US); Jason Seale, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 583 days.

(21) Appl. No.: 11/231,194

(22) Filed: Sep. 20, 2005

(65) Prior Publication Data

US 2007/0063712 A1    Mar. 22, 2007

(51) Int. Cl.
*G01R 27/26* (2006.01)
(52) U.S. Cl. .................................. 324/662; 324/690
(58) Field of Classification Search ............ 324/662, 324/690
See application file for complete search history.

(56) References Cited

U.S. PATENT DOCUMENTS

| 2,825,973 | A | * | 3/1958 | Shaw et al. ............... 33/655 |
| 5,119,036 | A | * | 6/1992 | Rickards et al. ........... 324/662 |
| 5,166,626 | A |  | 11/1992 | Hester et al. |
| 5,649,369 | A | * | 7/1997 | Thoren ................... 33/655 |
| 5,973,502 | A | * | 10/1999 | Bailleul et al. ............ 324/662 |
| 6,575,011 | B1 |  | 6/2003 | Busby et al. |
| 6,657,217 | B2 |  | 12/2003 | Adams et al. |
| 6,848,193 | B1 | * | 2/2005 | Kirzhner ................. 33/655 |

* cited by examiner

*Primary Examiner*—Timothy J Dole
(74) *Attorney, Agent, or Firm*—Cantor Colburn LLP

(57) ABSTRACT

A blade tip clearance probe holder including: a first housing in operable communication with a first feature of a casing for a rotary machine; a spring rod assembly in operable communication with the first housing; an electrical capacitance clearance meter in operable communication with the spring rod assembly; and a second housing in operable communication with the first housing wherein the second housing initiates a preload on the spring rod assembly and wherein the electrical capacitance clearance meter maintains a constant spatial relationship with a second feature of the casing for the rotary machine.

13 Claims, 3 Drawing Sheets

BLADE TIP CLEARANCE PROBE HOLDER AND A METHOD FOR MEASURING BLADE TIP CLEARANCE

BACKGROUND

This disclosure relates generally to a blade tip clearance probe holder and a method for measuring blade tip clearance. More specifically, this disclosure relates to a blade tip clearance probe holder, which holds a capacitance probe that measures the gap between a blade tip and a blade housing.

Gas turbine engines, steam turbines, aircraft engines, jet engines and other axial flow turbomachinery are typically designed to minimize the radial gaps between the blade tips and the blade housings or cases. Gaps between the blade tips and the cases can reduce efficiency by allowing gas or air to leak into the downstream stages of engine operation. The gaps between the blade tips and the cases are a function of engine speed and temperature, and the gaps changes during engine operation. High operating rotational speeds can cause radial elastic growth in rotating hardware (i.e. blades), resulting in radial blade tip growth. Additionally, high temperatures cause thermal expansion in the case and in the rotating hardware. Currently several inspection methods for determining the gap between the blade tips and the fan cases at operating speed are being used.

One method for determining the gap between the blade tips and the case utilizes a thin metal rod inserted and fastened into an axially drilled bolt, the resulting assembly being inserted into a mount plate attached to the fan case. The end of the rod is located where the blade tips should be. The method requires that the engine is operated for a specified time period after which the amount of wear on the rod is measured to determine the change in the gap between the blade tips and the case. The method is insufficient in that the thin metal rods often bend or break which renders measurement thereof moot. In addition, metal liberated from the thin metal rod, either as pieces or as powder can cause damage to the engine. Further, making these thin metal rods can be both difficult and time consuming because each rod must be custom made using a measurement of distance from the fan case to the blade tip. Further, such a method suffers from errors such as measurement, data recording, and machining. It is often the case that the thin metal rods are made either too short or too long. Short rods do not rub the blade tip, while long rods bend or break.

Another method of determining the gap between the blade tips and the case utilizes an electrical capacitance clearance meter, as described in U.S. Pat. No. 5,166,626. The electrical capacitance clearance meter includes a probe that has a capacitor electrode that is electrically connected to an electrical inductor within the probe that is inserted into the fan case to position its electrode at the inner surface of the casing. Electrical power is supplied through a voltage controlled variable frequency oscillator having a tuned circuit of which the probe is a component. The oscillator signal is modulated by a change in electrical capacitance between the probe electrode and a passing blade tip surface while an automatic feedback correction circuit corrects oscillator signal drift. A change in distance between the blade tip and the probe electrode is a change in capacitance therebetween which frequency modulates the oscillator signal. The modulated oscillator signal is then processed through a phase detector and related circuitry to provide an electrical signal that is proportional to the clearance gap.

Newly designed cases require that the clearance probes pass through two features or parts that move independently of each other in order to effectively measure the gap between blade tips and fan case. Current probe holders, such as those described in U.S. Pat. No. 5,166,626, are suitable for mounting on only a single feature and are not capable of being mounted through two or more independently moving features. For the foregoing reasons, there is a need for a new blade tip clearance probe holder and a method for measuring blade tip clearance.

BRIEF DESCRIPTION

Disclosed herein is a blade tip clearance probe holder including: a first housing in operable communication with a first feature of a casing for a rotary machine; a spring rod assembly in operable communication with the first housing; an electrical capacitance clearance meter in operable communication with the spring rod assembly; and a second housing in operable communication with the first housing wherein the second housing initiates a preload on the spring rod assembly and wherein the electrical capacitance clearance meter maintains a constant spatial relationship with a second feature of the casing for the rotary machine.

Also disclosed herein is a method for measuring blade tip clearance in a rotary machine including: inserting a blade tip clearance probe holder into a casing for the rotary machine, the blade tip clearance probe holder including an electrical capacitance clearance meter; affixing a first housing of the blade tip clearance probe holder to the casing for the rotary machine; affixing a second housing of the blade tip clearance probe holder to the first housing; and measuring a clearance gap between a blade of the rotary machine and a second feature of the casing for the rotary machine wherein the electrical capacitance clearance meter maintains a constant spatial relationship to the second feature of the casing for the rotary machine.

Further disclosed herein is a blade tip clearance probe holder including: a first housing in operable communication with a first feature of a casing for a rotary machine; a spring rod assembly; the spring rod assembly including: a bearing in operable communication with a spring rod; a spring slidably disposed on the spring rod; and a spacer slidably disposed on the spring rod, wherein the bearing is in operable communication with the first housing; an electrical capacitance clearance meter in operable communication with the spring rod assembly; and a second housing in operable communication with the first housing wherein the second housing initiates a preload on the spring and wherein the electrical capacitance clearance meter maintains a constant spatial relationship with a second feature of the casing for a rotary machine.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

These and other features, aspects, and advantages of the present invention will become better understood when the following detailed description is read with reference to the accompanying figures, wherein.

DETAILED DESCRIPTION

Figure 1:
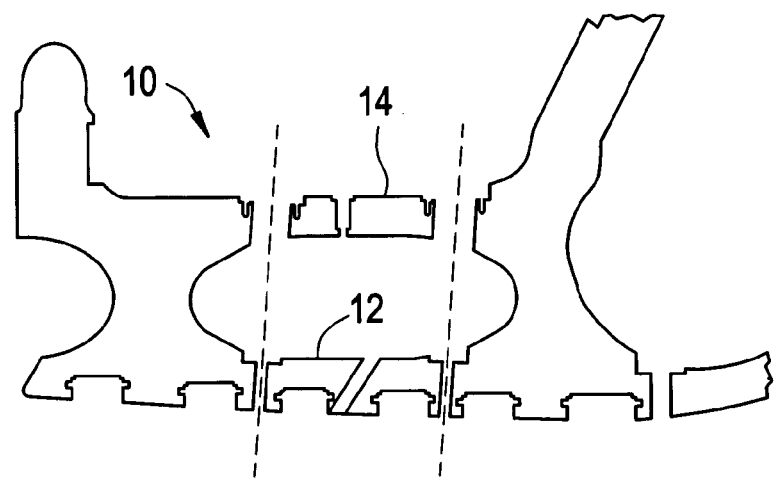
FIG. 1 is a schematic cross sectional view of a portion of a casing for a rotary machine.

Illustrated in FIG. 1 is a rotary machine casing 10 of the type for which the probe holder disclosed herein has been developed. It is further worthy of note that the casing 10 for a rotary machine may be any blade housing or cover that contains a blade required for engine operation. A plurality of blades (one shown) are disposed within the casing 10 for a specific function within a rotary machine, which function is not germaine to this disclosure. Rather, it is simply noted that the blade tip to casing clearance changes over time and operating conditions of the rotary machine. The disclosure hereof is directed to a method for measuring that clearance and a device therefore.

The casing 10, as illustrated in FIG. 1, includes a first feature 14 and a second feature 12. This construction presents a problem for measuring the blade tip clearance in that the second feature 12 is movable relative to the first feature 14. In order for a clearance probe to function appropriately, it must maintain a near constant spatial relationship with the second feature 12 regardless of the relative movements of features 12 and 14. Relative movements include, but are not limited to, radial elastic growth and thermal expansion.

Figure 2:
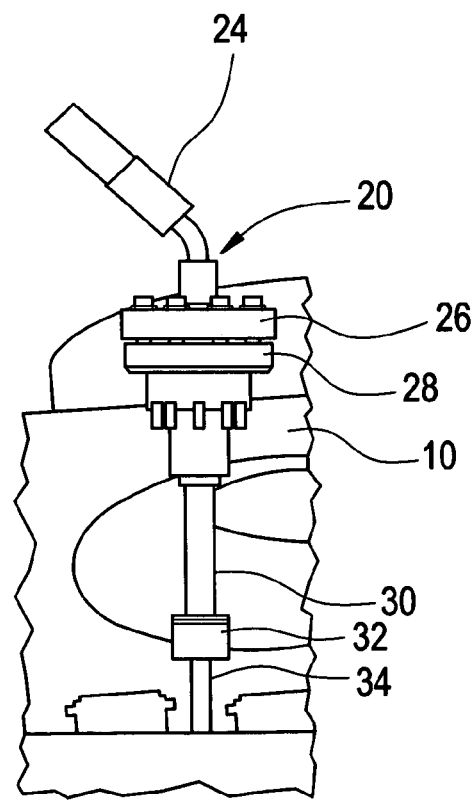
FIG. 2 is another schematic view of the casing portion with an exemplary embodiment of a blade tip clearance probe holder passing therethrough.

Turning now to FIG. 2, an exemplary embodiment of a blade tip clearance probe holder 20 is depicted passing through the casing 10 for a rotary machine. The blade tip clearance probe holder 20 includes a guide tube 24, a first housing 28, a second housing 26, a spring rod assembly 30, a shim 32, and an electrical capacitance clearance meter 34. The guide tube 24 is affixed to the second housing 26 with a fitting 36. The second housing 26 is fastened to the first housing 28, which is designed to be fastened to the first feature 14 of the casing 10 for a rotary machine. The second housing 26 contacts and initiates a preload on the spring rod assembly 30 inside of the first housing 28. The spring rod assembly 30 extends from the first housing 28 and is affixed to the shim 32 and to the electrical capacitance clearance meter 34. The spring rod assembly 30 ensures that the shim 32 contacts the second feature 12 of the casing 10 for a rotary machine and that the electrical capacitance clearance meter 34 is in the proper position to measure the gap between the second feature 12 and the blade tips. The shim 32 forms a seal with the second feature 12 and reduces air leakage from the casing 10 for a rotary machine. The blade tip clearance probe holder 20 is designed such that electrical capacitance clearance meter 34 remains in a constant position relative to the second feature 12 of the casing 10 for a rotary machine while floating relative to the first feature 14 of the casing 10 for a rotary machine.

Figure 3:
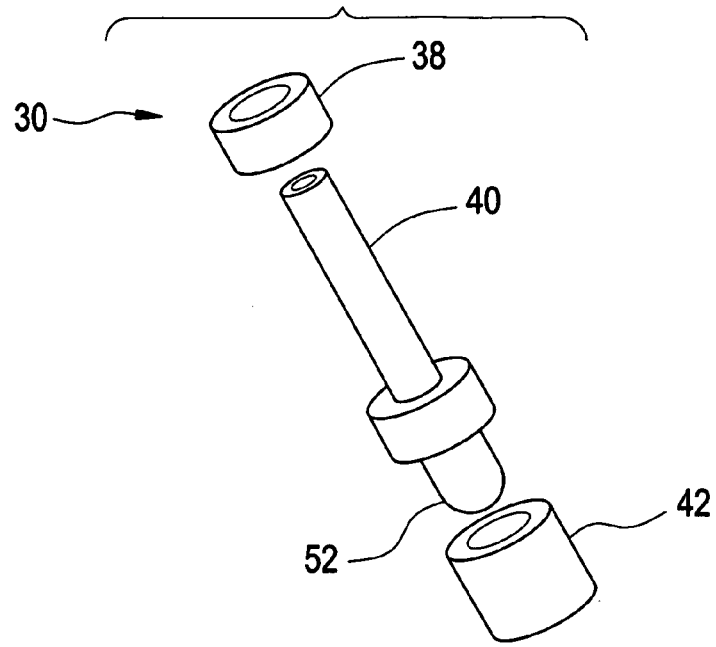
FIG. 3 is a schematic perspective exploded view of an exemplary embodiment of a spring rod assembly.

Turning now to FIG. 3, an exemplary embodiment of the spring rod assembly 30 is depicted. The spring rod assembly 30 includes a spacer 38, a spring rod 40, and a cup 42. The spring rod 40 is generally cylindrical in nature and includes portions of varying widths. The spring rod 40 includes a spherical end 52 designed to be received by a relief in the cup 42. The spherical end 52 of the spring rod 40 may form a ball-and-socket type joint with the cup 42 such that the spring rod 40 is allowed some degree of rotary motion in every direction. The spacer 38 is designed to have a generally toroidal shape and to be slidably disposed on the spring rod 40.

Figure 4:
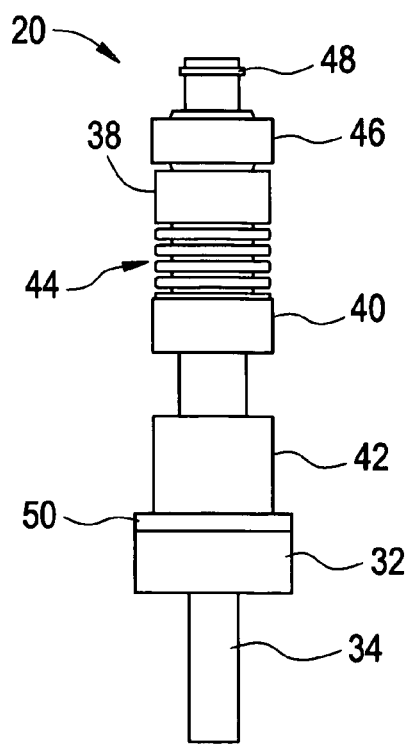
FIG. 4 is a schematic view of a portion of an exemplary embodiment of a blade tip clearance probe holder.

Continuing now with reference to FIG. 4, an exemplary embodiment of a portion of the blade tip clearance probe holder 20 is depicted. A spring 44 and a bearing 46 are slidably disposed onto the spring rod 40 along with the spacer 38. The spring 44, the bearing 46, and the spacer 38 are kept from sliding off of the spring rod 40 by a restrictor 48 that is affixed to one end of the spring rod 40. The restrictor 48 may be any type of restrictor capable of preventing the bearing 46, the spacer 38, and the spring 44 from sliding off of the spring rod 40 including, but not limited to, a c-clip or a pin. The cup 42 is affixed to an adjustment shim 50, the shim 32, and to the electrical capacitance clearance meter 34. The second housing 26 (FIG. 2) contacts the bearing 46, which compresses and initiates a preload on the spring 44. The bearing 46 is in operable communication with the first housing 28 and allows the spring rod assembly 30 to move laterally and axially to compensate for changes in the position of the second feature 12 relative to the first feature 14.

Figure 5:
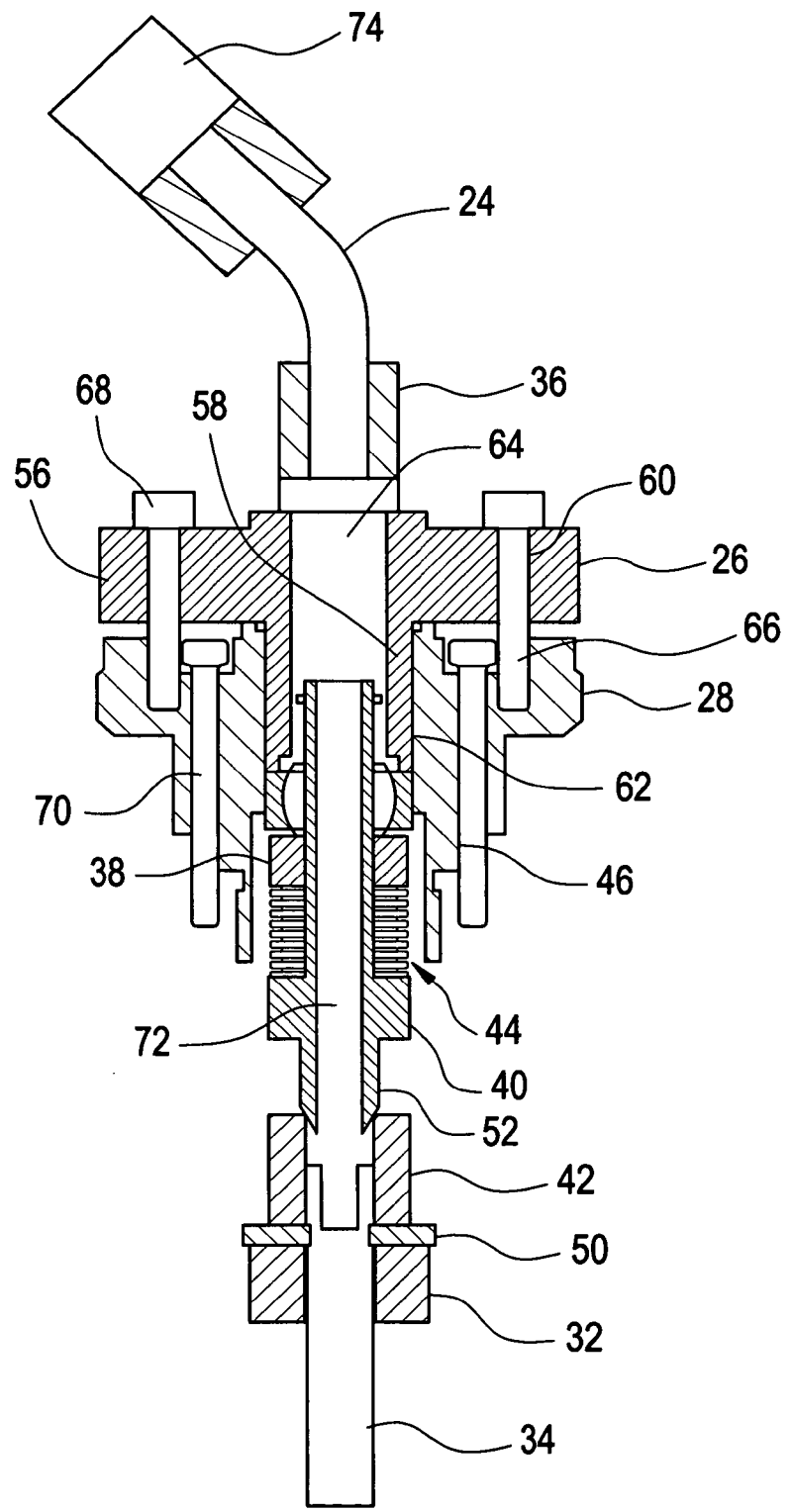
FIG. 5 is a cross sectional view of an exemplary embodiment of a blade tip clearance probe holder including the portion of FIG. 4.

Turning now to FIG. 5, a cross section of an exemplary embodiment of the blade tip clearance probe holder 20 is depicted. The blade tip clearance probe holder 20 includes the guide tube 24, the second housing 26, the first housing 28, the shim 32, the electrical capacitance clearance meter 34, the spacer 38, the spring rod 40, the cup 42, the springs 44, the bearing 46, and the adjustment shim 50. The guide tube 24 is affixed to the second housing 26 with the fitting 36. The second housing 26 is in operable communication with the first housing 28 and both the second housing 26 and the first housing 28 are in operable communication with the bearing 46. The second housing 26 contacts the bearing 46, which in turn exerts a force against the spring 44 and the bearing 46 allows the spring rod 40 freedom of movement within the first housing 28. The spring 44 and the bearing 46 combine to allow the electrical capacitance clearance meter 34 to maintain a near constant spatial relationship with the second feature 12 (FIG. 1) while allowing for radial, lateral, and axial changes in position between the second feature 12 and the first feature 14 of the casing 10. The second housing 26, the spring rod 40, the spacer 38, and the cup 42 include a first bored portion 72 suitable for inserting a wire through.

Continuing with FIG. 5, the second housing 26 includes a first portion 56 and a second portion 58, the first portion is generally cylindrical in shape and contains a first bored securement hole 60. The second portion 58 is also generally cylindrical in shape, but with a smaller radius that the first portion 56. The second portion 58 is sized to fit into a central bore 62 in the first housing 28. The second housing 26 also includes a second bored portion 64 suitable for running the wire through. The first housing 28 includes a second bored securement hole 66 corresponding to the first securement hole 60 of the second housing 26, which is designed to receive a bolt 68 to secure the second housing 26 to the first housing 28. The first housing 28 also includes a third securement hole 70, which is designed to allow the bolt 68 to secure the first housing 28 to the casing 10.

The bearing 46 is designed to fit into the central bore 62 of the first housing 28. Additionally, the second portion 58 of the second housing 26 is designed to contact the bearing 46 and the second bored portion 64 of the first housing 28 is designed to receive the spring rod 40. This configuration allows the spring rod 40 to move with respect to the second housing 26 while the bearing 46 remains in a near constant spatial relationship with the second housing 26.

The spherical end 52 of the spring rod 40 may form a ball-and-socket type joint with the cup 42 such that the spring rod 40 is allowed some degree of rotary motion in every direction. Additionally, the spring rod 40 and the cup 42 include the first bored portion 72 that is suitable for running a wire through. The wire is affixed to the electrical capacitance clearance meter 34 and extends through the blade tip clearance probe holder 20, including the cup 42, the spring rod 40, and the second housing 26. The wire exits the blade tip clearance probe holder 20 through the fitting 36.

The blade tip clearance gap can be measured through multiple features of the casing 10 in high temperature environments by inserting the blade tip clearance probe holder 20 into the casing 10 for the rotary machine, the blade tip clearance probe holder 10 including the electrical capacitance clearance meter 34. The first housing 28 of the blade tip clearance probe holder 20 is affixed to the casing 10 for the rotary machine and the second housing 26 is affixed to the first housing initiating a preload force on the spring 44. The clearance gap between the blade tip and the second feature 12 of the casing 10 for the rotary machine is then measured using the electrical capacitance clearance meter 34 which maintains a constant spatial relationship to the second feature 12 of the casing 10.

The springs 44 are utilized in the design of the blade tip clearance probe holder 20 to force the shim 32 to stay in contact with and form a seal with the second feature 12 of the casing 10 for a rotary machine. In an exemplary embodiment, the springs 44 are a Belleville type spring washer stack that provides high forces for small deflections and will allow probe to float with outer wall during transient operation. The seal formed between the shim 32 and the second feature 12 reduces the air leakage in the casing 10 for a rotary machine. The design of the blade tip clearance probe holder 20 also facilitates the easy removal and reinstallation of the electrical capacitance clearance meter 34.

In an exemplary embodiment of the blade tip clearance probe holder 20 a wire is affixed to the electrical capacitance clearance meter 34 and extend through the blade tip clearance probe holder 20. The wire passes through the fitting 36, which may be any type of fitting suitable for connecting the guide tube 24 to the second housing 26. Additionally, the wire passes through a second fitting 74, such as a Conax fitting that seals around the wire entering the blade tip clearance probe holder 20. The guide tube 24 may be a curved tube, such as a Swagelok type tube, that allows the wire to move freely without binding. The electrical capacitance clearance meter includes a probe that has a capacitor electrode that is electrically connected to an electrical inductor within the probe that is inserted into the fan case to position its electrode at the second feature 12 of the casing 10. Electrical power is supplied to the electrical capacitance clearance meter 34 through a voltage controlled variable frequency oscillator. The oscillator signal is modulated by a change in electrical capacitance between the electrical capacitance clearance meter 34 and a passing blade tip surface while an automatic feedback correction circuit corrects oscillator signal drift. A change in distance between the blade tip and the electrical capacitance clearance meter 34 is indicated by a change in capacitance, which modulates the oscillator signal. The modulated oscillator signal is then processed through a phase detector and related circuitry to provide an electrical signal that is indicative of the clearance gap.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A blade tip clearance probe holder comprising:
    a first housing in operable communication with a first feature of a casing for a rotary machine;
    a spring rod assembly in operable communication with said first housing;
    an electrical capacitance clearance meter in operable communication with said spring rod assembly; and
    a second housing in operable communication with said first housing wherein said second housing initiates a preload on said spring rod assembly and wherein said electrical capacitance clearance meter maintains a constant spatial relationship with a second feature of said casing for said rotary machine.

2. The blade tip clearance probe holder of claim 1 wherein said spring rod assembly comprises:
    a bearing in operable communication with a spring rod;
    a spring slidably disposed on said spring rod; and
    a spacer slidably disposed on said spring rod, wherein said bearing is in operable communication with the first housing.

3. The blade tip clearance probe holder of claim 2 wherein said spring is a Belleville spring stack.

4. The blade tip clearance probe holder of claim 2 comprising a shim in operable communication with said spring rod assembly wherein said spring causes said shim to form a seal with said second feature of said casing for said rotary machine.

5. The blade tip clearance probe holder of claim 1 wherein at least a portion of said spring rod assembly is located inside said first housing.

6. The blade tip clearance probe holder of claim 1 comprising a shim in operable communication with said spring rod assembly wherein said shim forms a seal with said second feature of said casing for said rotary machine.

7. A method for measuring blade tip clearance in a rotary machine comprising:
    inserting a blade tip clearance probe holder into a casing for said rotary machine, said blade tip clearance probe holder comprising an electrical capacitance clearance meter;
    affixing a first housing of said blade tip clearance probe holder to said casing for said rotary machine;
    affixing a second housing of said blade tip clearance probe holder to said first housing wherein affixing said second housing to said first housing initiates a force on a spring; and
    measuring a clearance gap between a blade of said rotary machine and a second feature of said casing for said rotary machine wherein said electrical capacitance clearance meter maintains a constant spatial relationship to said second feature of said casing for said rotary machine.

8. The method of claim 7 comprising forming a seal between a shim and said second feature of said casing for said rotary machine wherein said seal reduces air leakage in said casing for said rotary machine.

9. The method of claim 7 comprising forming a seal between said first housing of said casing for a rotary machine wherein said seal reduces air leakage in said casing for said rotary machine.

10. A blade tip clearance probe holder comprising:

a first housing in operable communication with a first feature of a casing for a rotary machine;

a spring rod assembly; said spring rod assembly comprising:
- a bearing in operable communication with a spring rod;
- a spring slidably disposed on said spring rod; and
- a spacer slidably disposed on said spring rod, wherein said bearing is in operable communication with the first housing;

an electrical capacitance clearance meter in operable communication with said spring rod assembly; and a second housing in operable communication with said first housing wherein said second housing initiates a preload on said spring and wherein said electrical capacitance clearance meter maintains a constant spatial relationship with a second feature of said casing for a rotary machine.

11. The blade tip clearance probe holder of claim 10 wherein said spring is a Belleville spring stack.

12. The blade tip clearance probe holder of claim 10 wherein at least a portion of said spring rod assembly is located inside said first housing.

13. The blade tip clearance probe holder of claim 10 comprising a shim in operable communication with said spring rod assembly wherein said spring causes said shim to form a seal with said second feature of said casing for said rotary machine.

* * * * *